3,217,000
7-THIENYLMERCAPTOACETAMIDO-CEPHALO-
SPORANIC ACID DERIVATIVES
Edwin H. Flynn, Indianapolis, Ind., assignor to Eli Lilly
and Company, Indianapolis, Ind., a corporation of
Indiana
No Drawing. Filed June 26, 1963, Ser. No. 290,624
3 Claims. (Cl. 260—243)

This is a continuation-in-part of copending application Serial No. 99,998, filed April 3, 1961.

This invention relates to novel organic compounds and to methods for their preparation.

The novel compounds of the present invention are thienylmercaptomethyl cephalosporin $C_A$ compounds, having the following formula:

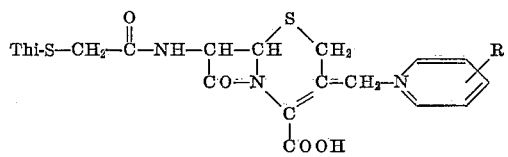

where Thi is 2-thienyl or 3-thienyl, and R is a substituent at the 3 or 4 position of the pyridino ring, selected from the group consisting of cyano, carboxy, carbamyl, N-methylcarbamyl, carbo($C_1$–$C_4$)alkoxy, hydroxy, and ($C_1$–$C_4$)alkanoyl; and the salts thereof with pharmaceutically acceptable acids.

In naming the novel compounds of the invention, it is convenient to designate the basic saturated fused-ring beta-lactam thiazine structure as "cepham,"

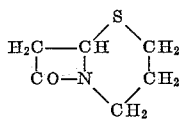

and to name the compounds as derivatives thereof, the term "cephem" referring to the basic structure with a single olefinic-bond. According to this system, cephalosporin $C_A$ itself would be named 7-(5'-aminoadipamido)-3-pyridinomethyl - 3 - cephem-4-carboxylic acid. More informally, it is convenient to consider the compounds as thienylmercaptomethyl analogues of cephalosporin $C_A$ itself (thienylmercaptomethyl replacing the radical attached to the CO—NH— group in the 7 position) and to designate the pyridine compound employed to replace the acetoxy group in the 3 position. Thus, 7-(2'-thienylmercaptoacetamido) - 3 - (4'-carbamyl-pyridinomethyl)-3-cephem-4-carboxylic acid can be called "2-thienylmercaptomethyl isonicotinamide cephalosporin $C_A$."

The following compounds are illustrative examples of the compounds lying within the scope of the present invention:

2-thienylmercaptomethyl isobptyl isonicotinate cephalosporin $C_A$
2-thienylmercaptomethyl 4-isobutyrylpyridine cephalosporin $C_A$
3-thienylmercaptomethyl isonicotinamide cephalosporin $C_A$
2-thienylmercaptomethyl isonicotinic acid cephalosporin $C_A$
3-thienylmercaptomethyl 4-propionylpyridine cephalosporin $C_A$
2-thienylmercaptomethyl 3-acetylpyridine cephalosporin $C_A$
3-thienylmercaptomethyl N'-methylnicotinamide cephalosporin $C_A$
3-thienylmercaptomethyl 4-cyanopyridine cephalosporin $C_A$
2-thienylmercaptomethyl nicotinamide cephalosporin $C_A$
3-thienylmercaptomethyl sec.-butyl nicotinate cephalosporin $C_A$
3-thienylmercaptomethyl N'-methylisonicotinamide cephalosporin $C_A$
2-thienylmercaptomethyl 3-butyrylpyridine cephalosporin $C_A$
3-thienylmercaptomethyl nicotinic acid cephalosporin $C_A$
3-thienylmercaptomethyl 4-hydroxypyridine cephalosporin $C_A$
3-thienylmercaptomethyl ethyl isonicotinate cephalosporin $C_A$
2-thienylmercaptomethyl n-propyl nicotinate cephalosporin $C_A$
3-thienylmercaptomethyl methyl nicotinate cephalosporin $C_A$
2-thienylmercaptomethyl 3-hydroxypyridine cephalosporin $C_A$
2-thienylmercaptomethyl 3-cyanopyridine cephalosporin $C_A$ and the salts thereof with pharmaceutically acceptable acids, illustratively the hydrochloride, hydrobromide, sulfate, nitrate, orthophosphate, and naphthalenesulfonate salts and the like.

The compounds of the present invention are readily prepared from the analogous thienylmercaptomethyl cephalosporin C compound, having the thienylmercaptomethyl group in the 7 position and the characteristic acetoxymethyl group in the 3 position, by commingling in aqueous solution with an excess of the appropriate substituted pyridine and allowing to react at elevated temperature. The reaction is suitably carried out at around pH 3–8.5, preferably pH 6–7, and at a temperature from about 40 to about 100° C., preferably around 50–75° C. Under the preferred conditions, a reaction time of 4 to 8 hours is generally sufficient. Lower temperatures require longer times, while higher temperatures tend to cause product degradation. The thienylmercaptomethyl cephalosporin C compound can be used in the form of the free acid or a salt, and the pyridine compound should preferably be used in substantial excess, e.g., a molar ratio of 3:1 to 10:1 or more, in order to maximize the conversion of the thienylmercaptomethyl cephalosporin C compound, the excess being readily recoverable for reuse. Under the reaction conditions, the acetoxy group is split off and replaced by the substituted pyridine compound, the attachment of the latter to the residual methylene group being directly to the ring nitrogen atom, forming a quaternary ammonium derivative, which in turn forms an inner salt with the carboxyl in the 4 position.

The desired product is readily isolated from the reaction product mixture by evaporation to dryness under vacuum, triturating with acetone to remove starting materials, and repeatedly precipitating from aqueous solution by addition of acetone. In many cases, the product can be crystallized directly from aqueous solution by dissolving in water at elevated temperature and then cooling.

The desired thienylmercaptomethyl cephalosporin C starting material is readily prepared by acylating 7-aminocephalosporanic acid with an acylating agent having the desired thienylmercaptoacetyl structure under conventional conditions. A convenient acylating agent is the appropriate thienylmercaptoacetyl chloride or bromide. The acylation is carried out in water or in an appropriate organic solvent, preferably under substantially neutral conditions, and preferably at reduced temperature, i.e., above the freezing point of the reaction mixture and up to about 20° C. In a typical procedure, 7-aminocephalosporanic acid is commingled with aqueous 50 volume-percent acetone and a sufficient quantity of sodium bicarbonate to promote solution, the concentration of 7-aminocephalosporanic acid being about 1 to about 4 percent by weight. The solution is cooled to around 0 to 5° C., and a solution of 2-thienylmercaptoacetyl chloride is added in about 20 percent excess, with stirring and cooling. The mixture is then allowed to warm to room temperature, after which it is acidified to around pH 2 and extracted with ethyl acetate or other immiscible organic solvent. The ethyl acetate extract is adjusted to around pH 4.5 with potassium hydroxide or other base, and is extracted with water. The water solution is separated and evaporated to dryness. The residue is taken up in the minimum quantity of water, and the acylated product is precipitated by adding a large excess of acetone and, if necessary, ether. The crystalline material obtained thereby is filtered, washed with acetone, and dried.

Acylation of the 7-amino group can also be carried out with the appropriate thienylmercaptoacetic acid, employed in conjunction with an equimolar proportion or more of a cardodiimide, and the acylation proceeds at ordinary temperatures in such cases. Any of the carbodiimides are effective for this purpose, the active moiety being the —N=C=N— structure. Illustrative examples include N,N'-diethylcarbodiimide, N,N'-di-n-propylcarbodiimide, N,N'-diisopropylcarbodiimide, N,N'-dicyclohexylcarbodiimide, N,N'-diallylcarbodiimide, N,N'-bis(p-dimethylaminophenyl)-carbodiimide, N-ethyl-N'-(4''-ethylmorpholinyl) carbodiimide, and the like, other suitable carbodiimides being disclosed by Sheehan in U.S. Patent No. 2,938,892 (May 31, 1960), and by Hofmann et al. U.S. Patent No. 3,065,224 (November 20, 1962).

Alternatively, the acylation of the 7-amino group can be carried out with an activated derivative of an appropriate thienylmercaptoacetic acid, suitably the corresponding acid anhydride, or a mixed anhydride, or the azide, or an activated ester. Other suitable derivatives can readily be ascertained from the art.

The compounds of the present invention can also be prepared by reacting 7-aminocephalosporanic acid with the appropriate substituted pyridine compound under the conditions described above, then subjecting the quaternized intermediate (which can be considered the nucleus of a cephalosporin $C_A$ analogue) to thienylmercaptoacetylation according to any of the procedures described above.

In a further alternative method, cephalosporin C is reacted with the appropriate substituted pyridine compound to form the corresponding cephalosporin $C_A$ analogue, the latter is subjected to cleavage to remove the 5-aminoadipyl side chain, yielding the nucleus of the cephalosporin $C_A$ analogue, and the latter is acylated according to any of the procedures described above. The cleavage reaction is preferably carried out by exposing the cephalosporin $C_A$ analogue to the action of nitrosyl chloride or other nitrosating agent in substantially anhydrous formic acid solution at a temperature around 20 to 30° C.

The invention will be more readily understood from the following operating example, which is submitted as illustrative only, and not by way of limitation.

EXAMPLE

α-Thienylmercaptomethyl isonicotinamide cephalosporin $C_A$ 7-(2'-thienylmercaptoacetamido) cephalosporanic acid sodium salt (0.5 g.) was mixed with 5 ml. of water and 1.0 g. of isonicotinamide, and heated for two days at 40° C. The mixture was then filtered and the filtrate was evaporated to dryness under vacuum. The residue was dissolved in water and reprecipitated with acetone, and an impure product weighing 255 mg. was obtained thereby. A 90-mg. portion of this material was dissolved in hot water and recrystallized by cooling. The crystalline product thus obtained weighed 25 mg., had a maximum in its ultraviolet absorption spectrum at 260 mμ (ε=13,000) and an antibiotic potency of 700 penicillin G units per milligram, as determined against Staphylococcus aureus 209P by an appropriate modification of the paper disc plate methods of Higgens et al., Antibiotics & Chemotherapy, 3, 50–54 (January 1953), and Loo et al., Journal of Bacteriology, 50, 701–709 (1945).

The product, 7-(2'-thienylmercaptoacetamido)-3-(4'-carbamylpyridinomethyl)-3-cephem-4-carboxylic acid, had a minimum inhibitory concentration (MIC) against four clinical isolates of penicillin-resistant Staphylococcus aureus of 1 to 2 μg./ml. in the presence of human blood serum and 0.5 to 4 μg./ml. in the absence of serum, measured by the gradient-plate technique. Against Gram-negative organisms, the product had minimum inhibitory concentrations as follows.

| Organism: | MIC, μg./ml. |
|---|---|
| Shigella sonnei | 10–20 |
| Shigella N–9 [1] | 4 |
| E. coli N–10 [1] | 11 |
| E. coli N–26 [1] | 5–10 |
| Klebsiella pneumoniae | 8 |
| K. pneumoniae K–1 [1] | 20 |
| Aerobacter aerogenes | 10 |

[1] Clinical isolate.

Other compounds within the scope of the present invention are prepared according to the procedure of the foregoing example by reaction of a 7-thienylmercaptoacetamido cephalosporanic acid in the form of the free acid, the sodium salt, or the like, with an appropriately substituted pyridine compound, as follows:

7 - (2'-thienylmercaptoacetamido)-3-(4'-cyanopyridinomethyl)-3-cephem-4-carboxylic acid, from 4-cyanopyridine.

7 - (2'-thienylmercaptoacetamido)-3-(3'-cyanopyridinomethyl)-3-cephem-4-carboxylic acid, from 3-cyanopyridine.

7 - (2' - thienylmercaptoacetamido)-3-(4'-[N''-methylcarbamyl]-pyridinomethyl)-3-cephem-4 - carboxylic acid, from 4-(N'-methylcarbamyl)pyridine.

7 - (3' - thienylmercaptoacetamido)-3-(3'-hydroxypyridinomethyl) - 3 - cephem-4-carboxylic acid, from 3-hydroxypyridine.

7 - (2'-thienylmercaptoacetamido)-3-(4'-carbomethoxypyridinomethyl)-3-cephem-4-carboxylic acid, from methyl isonicotinate.

7 - (3' - thienylmercaptoacetamido)-3-(3'-[N''-methylcarbamyl] - pyridinomethyl)-3-cephem-4-carboxylic acid, from 3-(N'-methylcarbamyl)pyridine.

7 - (3' - thienylmercaptoacetamido) - 3-(4'-acetylpyridinomethyl)-3-cephem-4-carboxylic acid, from 4-acetylpyridine.

The compounds of the present invention are characterized by resistance to the destructive action of penicillinase, minimal toxicity, high activity against a broad range of Gram-positive pathogens, lower but effective activity against many of the Gram-negative pathogens, and prolonged action upon intramuscular injection, extending for seven to fourteen days or more.

I claim:
1. The compounds having the following formula, and the salts thereof with pharmaceutically acceptable acids:

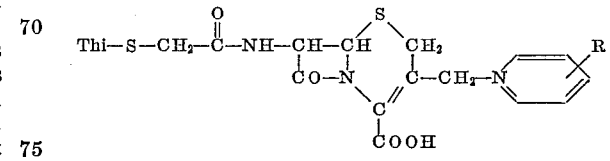

wherein Thi is a member of the group consisting of 2-thienyl and 3-thienyl and R is a member of the group consisting of cyano, carboxy, carbamyl, N-methylcarbamyl, carbo($C_1$–$C_4$)alkoxy, hydroxy, and ($C_1$–$C_4$)alkanoyl, attached to the pyridine ring in the 3 and 4 positions.

2. 7 - (2' - thienylmercaptoacetamido)-3-(4'-carbamylpyridinomethyl)-3-cephem-4-carboxylic acid.

3. 7 - (3' - thienylmercaptoacetamido)-3-(4'-carbamylpyridinomethyl)-3-cephem-4-carboxylic acid.

No references cited.

NICHOLAS S. RIZZO, *Primary Examiner*.